(12) United States Patent
Marin

(10) Patent No.: US 10,102,269 B2
(45) Date of Patent: Oct. 16, 2018

(54) OBJECT QUERY MODEL FOR ANALYTICS DATA ACCESS

(71) Applicant: Microsoft Technology Licensing, LLC, Redmond, WA (US)

(72) Inventor: Adrian Marius Marin, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 527 days.

(21) Appl. No.: 14/742,213

(22) Filed: Jun. 17, 2015

(65) Prior Publication Data

US 2016/0253403 A1 Sep. 1, 2016

Related U.S. Application Data

(60) Provisional application No. 62/121,763, filed on Feb. 27, 2015.

(51) Int. Cl.
*G06F 17/30* (2006.01)
*G06F 8/51* (2018.01)

(52) U.S. Cl.
CPC .. *G06F 17/30592* (2013.01); *G06F 17/30292* (2013.01); *G06F 17/30389* (2013.01);
(Continued)

(58) Field of Classification Search
CPC ......... G06F 17/30592; G06F 17/30292; G06F 17/30389; G06F 17/30427; G06F 17/30483; G06F 17/30607; G06F 8/51; G06F 17/30
See application file for complete search history.

(56) References Cited

U.S. PATENT DOCUMENTS 16,263,342    7/2001    Chang et al.
6,285,997 B1    9/2001    Carey et al.
(Continued)

FOREIGN PATENT DOCUMENTS

CN         102682118 A    9/2012
WO    2004044785 A1    5/2004

OTHER PUBLICATIONS

Urban, et al., "An object-Oriented Query Language Interface to Relational Databases in a Multidatabase Database Environment", In Proceedings of the 14th International Conference on Distributed Computing Systems, Jun. 21, 1994, pp. 387-394.
(Continued)

*Primary Examiner* — Jared M Bibbee
(74) *Attorney, Agent, or Firm* — Christopher J. Volkmann; Kelly, Holt & Christenson, PLLC

(57) ABSTRACT

A computing device for executing a client application for analytics data access is provided. The computing device includes a processor that is a functional component of the computing device and is configured to execute software instructions to provide at least one client application function. A parsing component is configured to receive at least one data object of the client application and parse the at least one data object to provide an intermediate description of a query. At least one translator component is configured to receive the intermediate description of the query and generate a query string in a target query language. The computing device is configured to transmit the query string in the target query language to a data source for execution of the query.

19 Claims, 10 Drawing Sheets

(52) U.S. Cl.
CPC .. *G06F 17/30427* (2013.01); *G06F 17/30483* (2013.01); *G06F 17/30607* (2013.01); *G06F 8/51* (2013.01)

(56) References Cited

U.S. PATENT DOCUMENTS

| | | | |
|---|---|---|---|
| 6,347,315 B1* | 2/2002 | Kiyoki | G06F 17/30545 704/2 |
| 6,684,207 B1 | 1/2004 | Greenfield et al. | |
| 7,246,114 B2 | 7/2007 | Bolognese et al. | |
| 7,275,024 B2 | 9/2007 | Yeh et al. | |
| 7,461,052 B2 | 12/2008 | Dettinger et al. | |
| 7,526,503 B2 | 4/2009 | Bernstein et al. | |
| 7,567,968 B2 | 7/2009 | Desai et al. | |
| 7,877,397 B2 | 1/2011 | Nagarajan et al. | |
| 8,447,774 B1 | 5/2013 | Robie et al. | |
| 8,694,532 B2 | 4/2014 | Freire | |
| 8,819,046 B2 | 8/2014 | Warren et al. | |
| 2007/0027905 A1* | 2/2007 | Warren | G06F 8/51 |
| 2008/0195610 A1* | 8/2008 | Tin | G06F 17/30448 |
| 2008/0195649 A1* | 8/2008 | Lefebvre | G06F 17/3056 |
| 2008/0235202 A1* | 9/2008 | Wang | G06F 17/30669 |
| 2008/0288474 A1* | 11/2008 | Chin | G06F 17/30669 |
| 2008/0313161 A1* | 12/2008 | Ramsey | G06F 17/30545 |
| 2010/0106704 A1* | 4/2010 | Josifovski | G06F 17/289 707/708 |
| 2010/0250564 A1* | 9/2010 | Agarwal | G06F 8/30 707/756 |
| 2011/0093487 A1* | 4/2011 | Le Biannic | G06F 17/30563 707/765 |
| 2011/0202334 A1* | 8/2011 | Abir | G06F 17/2809 704/4 |
| 2012/0084301 A1 | 4/2012 | Sarnowicz et al. | |
| 2012/0185496 A1* | 7/2012 | Magdy | G06F 17/2818 707/760 |
| 2012/0330919 A1* | 12/2012 | Chen | G06F 17/3064 707/706 |
| 2012/0330989 A1* | 12/2012 | Tan | G06F 17/275 707/760 |
| 2012/0330990 A1* | 12/2012 | Chen | G06F 17/28 707/761 |
| 2014/0012563 A1* | 1/2014 | Caskey | G06F 17/30669 704/2 |
| 2014/0074817 A1* | 3/2014 | Neels | G06F 17/30424 707/711 |
| 2014/0236579 A1* | 8/2014 | Kurz | G06F 17/28 704/9 |
| 2014/0358932 A1* | 12/2014 | Brown | G06F 17/30445 707/741 |
| 2015/0178407 A1* | 6/2015 | Hughes | G06F 17/30967 707/768 |
| 2016/0117364 A1* | 4/2016 | Jahankhani | G06F 17/30427 707/760 |
| 2017/0139983 A1* | 5/2017 | Neels | G06F 17/30395 |

OTHER PUBLICATIONS

Trujillo, et al.. "An Object Oriented Approach to Multidimensional Databate Conceptual Modeling", In Proceedings of the 1st ACM international workshop on Data warehousing and OLAP, Nov. 1, 1998, pp. 16-21.

* cited by examiner

OBJECT QUERY MODEL FOR ANALYTICS DATA ACCESS

CROSS-REFERENCE TO RELATED APPLICATION

The present application is based on and claims the benefit of U.S. provisional patent application Ser. No. 62/121,763, filed Feb. 27, 2015, the content of which is hereby incorporated by reference in its entirety.

BACKGROUND

Data access across networks is ubiquitous in modern computing. Often, vast amounts of information are organized and stored in data warehouses located in servers in various geographical locations. Users interact with such information via client applications on computing devices. The client application(s) operating on the user's computing device communicates over the network with one or more servers in order to access the data.

Data access in client software applications, and particularly access to data in storage for analytics purposes, such as data warehouses and multi-dimensional databases, is commonly implemented by embedding queries written in the query language understood by the data server as text scripts in code of these applications. Then, the query scripts are sent to the data server for the server to execute and return the requested data to the client application.

SUMMARY

A computing device for executing a client application for analytics data access is provided. The computing device includes a processor that is a functional component of the computing device and is configured to execute software instructions to provide at least one client application function. A parsing component is configured to receive at least one data object of the client application and parse the at least one data object to provide an intermediate description of a query. At least one translator component is configured to receive the intermediate description of the query and generate a query string in a target query language. The computing device is configured to transmit the query string in the target query language to a data source for execution of the query.

This Summary is provided to introduce a selection of concepts in a simplified form that are further described below in the Detailed Description. This Summary is not intended to identify key features or essential features, nor is it intended to be used as an aid in determining scope.

DETAILED DESCRIPTION

Figure 1:
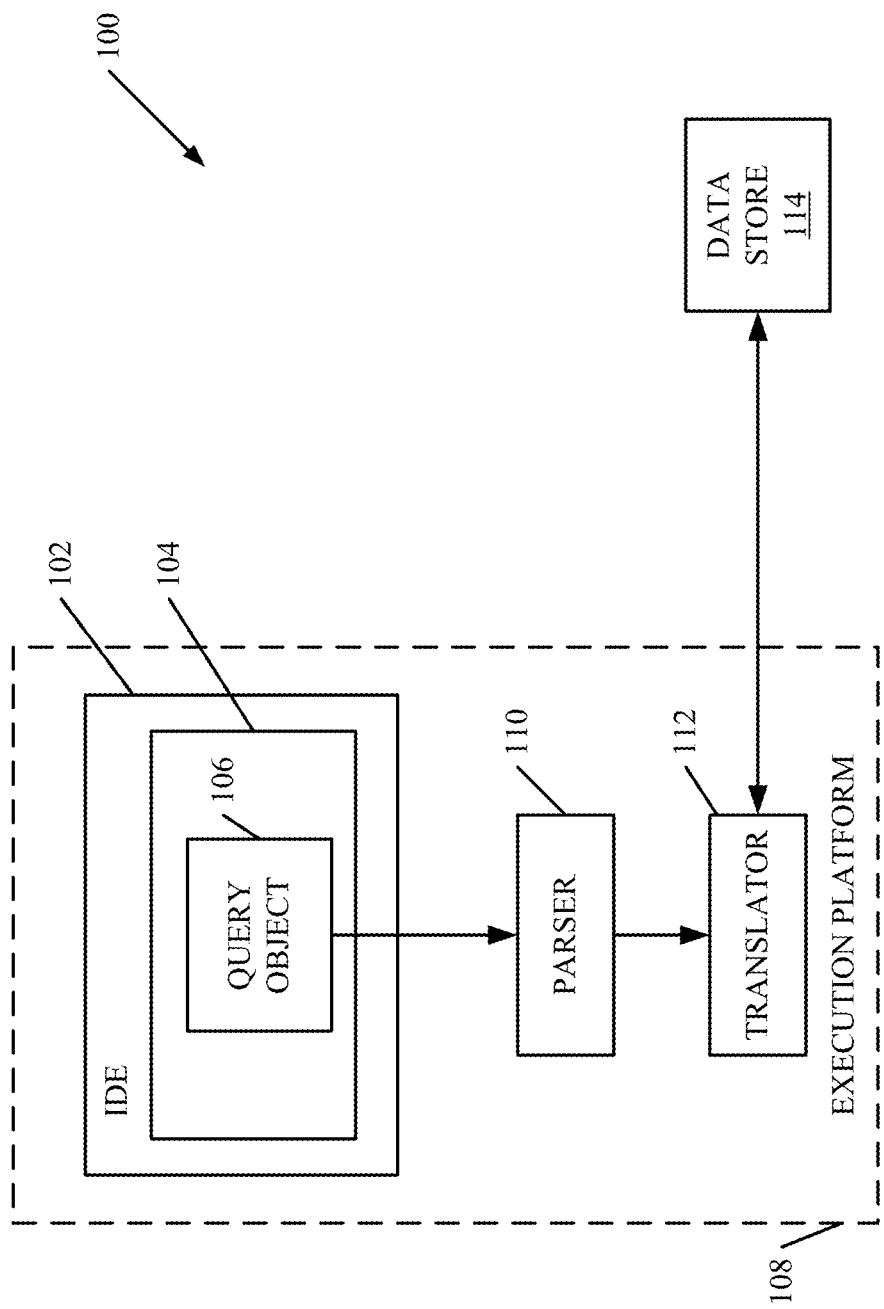
FIG. 1 is a diagrammatic view of a data access system in accordance of an embodiment.

Dimensional data models are widespread in data marts and data warehouse environments because they significantly simplify the queries for data retrieval and enable rapid aggregations and queries. Dimensional data models with star schemas are used, for example, by a number of proprietary implementations of online analytical processing (OLAP) databases and cubes or they can be used directly for data access in operational, transactional databases, for instance, by leveraging upcoming in-memory technologies for databases. Similarly, the backing system for data storage and access can use cloud infrastructure and technologies.

Data access in these environments and systems from client software applications is commonly implemented by embedding queries written in the query language that is understood by the data server as text scripts in the code of these applications. However, this approach to data access has some limitations. For example, the client applications that manipulate the query scripts have little or no compiler verification, which makes the discoverability of certain problems that could be handled by the compiler more difficult and delayed until runtime. Another limitation is that the query scripts must generally be written by the developer of the client application in the specific language that the server understands, which binds the code of the client application to the specific data server implementation, language and data format on the server to be queried. These limitations affect the maintainability of a system and the ability to change and evolve the data access system, for example, to implement new technologies for data storage and search. Furthermore, these limitations go against one of the main benefits of dimensional data models and data mart schemas, like start schema, which are commonly used in data warehouse environments for query simplification and easy data retrieval.

In accordance of embodiments described herein, an extensible query object-model is provided that allows developers of client applications that access data from data source systems for analytics—multidimensional models—to write queries in a simple way with no explicit join relations in the queries using object-oriented programming. Further, the design of the query model allows the client applications to be independent of the type and underlying technology of the data source system, which allows the client applications to work without changes when the implementation of the underlying data system changes.

In accordance of various embodiments described herein, the query object model suited for dimensional data models, such as those used in data warehouse scenarios, essentially decouples the client application from the underlying database technology used to implement the data source system, such as, for example, an online analytical processing (OLAP) database, or a relational, transactional database (OLTP) with in-memory technologies. In particular, at least one embodiment has been implemented to access data modeled in a star-schema and stored in OLAP databases.

Providing a system and methods that allow a developer to generate query object models that may be deployed against one or more different types of data servers without requiring modification of the object oriented programming is highly useful. For example, different data source systems and their underlying technologies are generally used in different circumstances based on the particular strengths of each type of system. OLAP systems are typically structured and designed in order to facilitate high speed analysis and thus are optimized for performing a high number of read operations. However, OLAP systems are typically limited in their ability to interact real-time with the underlying data. In contrast, OLTP systems provide users with the ability to interact real-time with the underlying data in the system. However, OLTP systems, are somewhat limited in their ability to provide fast analytics, in comparison to OLAP systems.

Accordingly, a developer writing a client application must generally choose the type of system to which the queries will be applied, and specifically embed the queries written in the query language understood by the selected server as text scripts in the code of the application under development. Should the developer later decide to target a different type of data server system with the object query, the code must be revised and recompiled.

Some aspects of embodiments described herein may bear similarities to a technology called LINQ (Language-Integrated Query), which is a set of features introduced in Microsoft's Visual Studio 2008 that extends query capabilities to the language syntax of C# and Visual Basic. Abstractions such as LINQ largely follow a tabular data model where data is stored in tables and relations between these tables are part of the query to access the data. However, this model still requires the developers of the queries to be familiar with the data relations in the underlying data structures being queried. In contrast, a dimensional model for analytics, as described herein and illustrated in FIG. 7, stores the relations in the data model and does not expose them in the query. Similarly, the data model stores additional information such as ordering rules for the data, aggregation functions for the numeric facts being queried or data grouping rules. This not only simplifies the query and the experience of authoring the query, but also allows the query developers to exclusively focus on the logic of their application domain without requiring extensive knowledge of the data relations in the storage model.

FIG. 1 is a diagrammatic view of a data access system in accordance with one embodiment. Data access system 100 includes an integrated development environment 102 that allows a developer to generate client application 104 having at least one query object 106 within client application 104. In one embodiment, client application 104 is written in object-oriented programming language. Suitable examples of such object-oriented programming languages include C#, Java and C++, among others. Further, query object 106 is also written or otherwise defined using an object model expressed in the object-oriented programming language. Once development of application 104 is complete, it is typically compiled and provided to an execution platform 108 for execution. Execution platform 108 may be the same system as that which hosts IDE 102, or it may be a separate system. Execution platform 108 may be a general purpose computing device, such as that described with respect to FIG. 10, a mobile computing device, such as that described with respect to FIG. 9. or any other suitable computing device. When query object 106 is invoked during the execution of client application 104, execution platform 108 causes object 106 to be passed to parser 110. Parser 110 parses the query object to generate a generic intermediate description of the query. Suitable examples of such generic intermediate description can include a syntax tree, for example. This intermediate description can also be altered to apply application or domain-specific rules, such as data security filters that are based on the profile of the user for which the query executes at runtime. The intermediate description generated by parser 110 with additional rules is then provided to a selected expression translator 112 that translates the intermediate description into a target data server script that is suitable for communication to data store 114. Accordingly, if the selected deployment environment is an OLTP database system, expression translator 112 will translate the intermediate description into a SQL script that is suitable for communication to data store 114. Execution platform 108 then sends the translated script to data store 114 and receives a result from data store 114. This result is then provided back to client application 104 for further processing.

Figure 2:
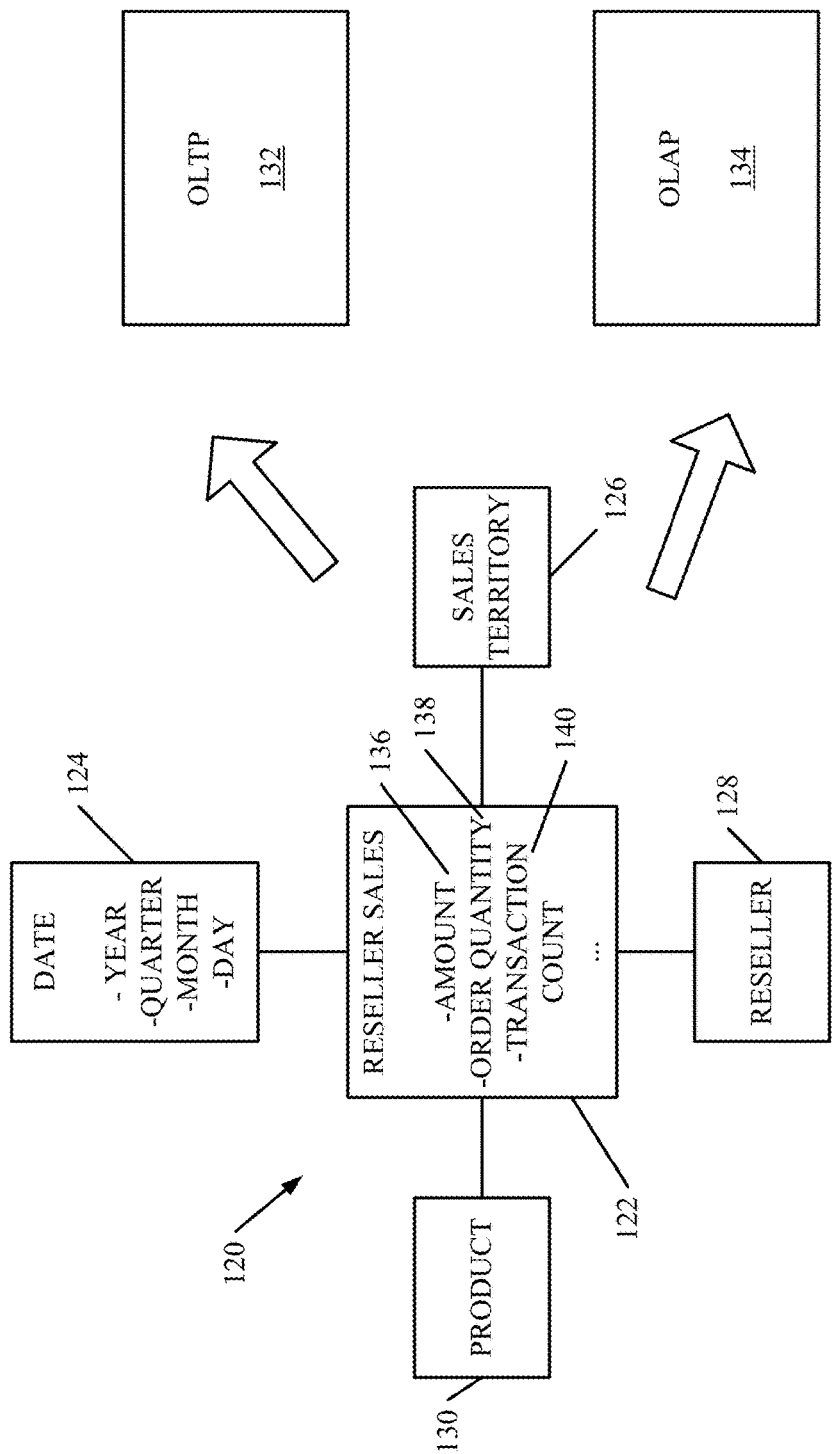
FIG. 2 is a diagrammatic view of a data model, in this case a star-schema that can be implemented in either an OLTP database system or an OLAP database system in accordance with one embodiment.

FIG. 2 is a diagrammatic view of a data model, in this case a star-schema that can be implemented in either an OLTP database system or an OLAP database system in accordance with one embodiment. Star-schema 120 generally includes a fact entity named here "Reseller-Sales" 122 having a number of numeric properties: Amount 136, Order Quantity 138, and Transaction Count 140. These numeric properties 136, 138, and 140 describe the sales performance, such as quantity 138, amount 136, and transaction count 140. The figure then shows a number of related dimensions Date 124, Sales Territory 126, Reseller 128, and Product 130, which consist of a set of attributes that describe the fact data, for example, annual sales. Star-schema 120 can be implemented using different data access technologies as set forth above, each of these implementations is supported by dedicated technologies and has its own language for data access. For example, SQL is typically used for access to OLTP database 132, while multidimensional expressions (MDX) is typically used for access to OLAP system 134. Other examples can include HiveQL for accessing Apache Hive data warehouse infrastructure. The OLTP implementation 132 (described in greater detail with respect to FIG. 3) sets forth the tables, key fields, and relations to implement model 120 including, for example, the list of indexes and their type, e.g., in-memory with column storage. Similarly OLAP model 134 sets forth so-called measures as well as dimensions, together with the usage and key relationships between measures and dimensions. OLAP system 134 is described in greater detail with respect to FIG. 4. The OLTP system 132 is accessible for data retrieval using SQL queries, while OLAP system 134 requires MDX queries.

Client applications that query data from a data system will typically use the query language specific to the implementation of the logical data model in that system. In the past, client applications would query data from a data system using the query language specific to the implementation of the logical data model for the implemented data access system. This could make it difficult for the implementation of the model to change without breaking the functionality of the client applications. For example, changing the implementation from OLAP cubes to OLTP tables with columnstore indexes, and from MDX scripts for data access to SQL, respectively, would have required large changes into the client applications. These client applications would need to be updated so that the queries employed by such client applications would be written in the appropriate query language for the new implementation. This effort was typically very expensive to carry out, especially when a large number of client applications and functionality, such as reports or charts, had been built around the data source to be changed or migrated.

In order to abstract from the specific implementations, technologies and query languages for data access, embodiments provided herein employ a query model solution that allows developers of client applications for data access to write queries that reference a star-schema model 120 and have different, pluggable, translator components to translate the query objects written by the developers into queries in the query language that the target data source system recognizes and knows how to execute.

Figure 3:
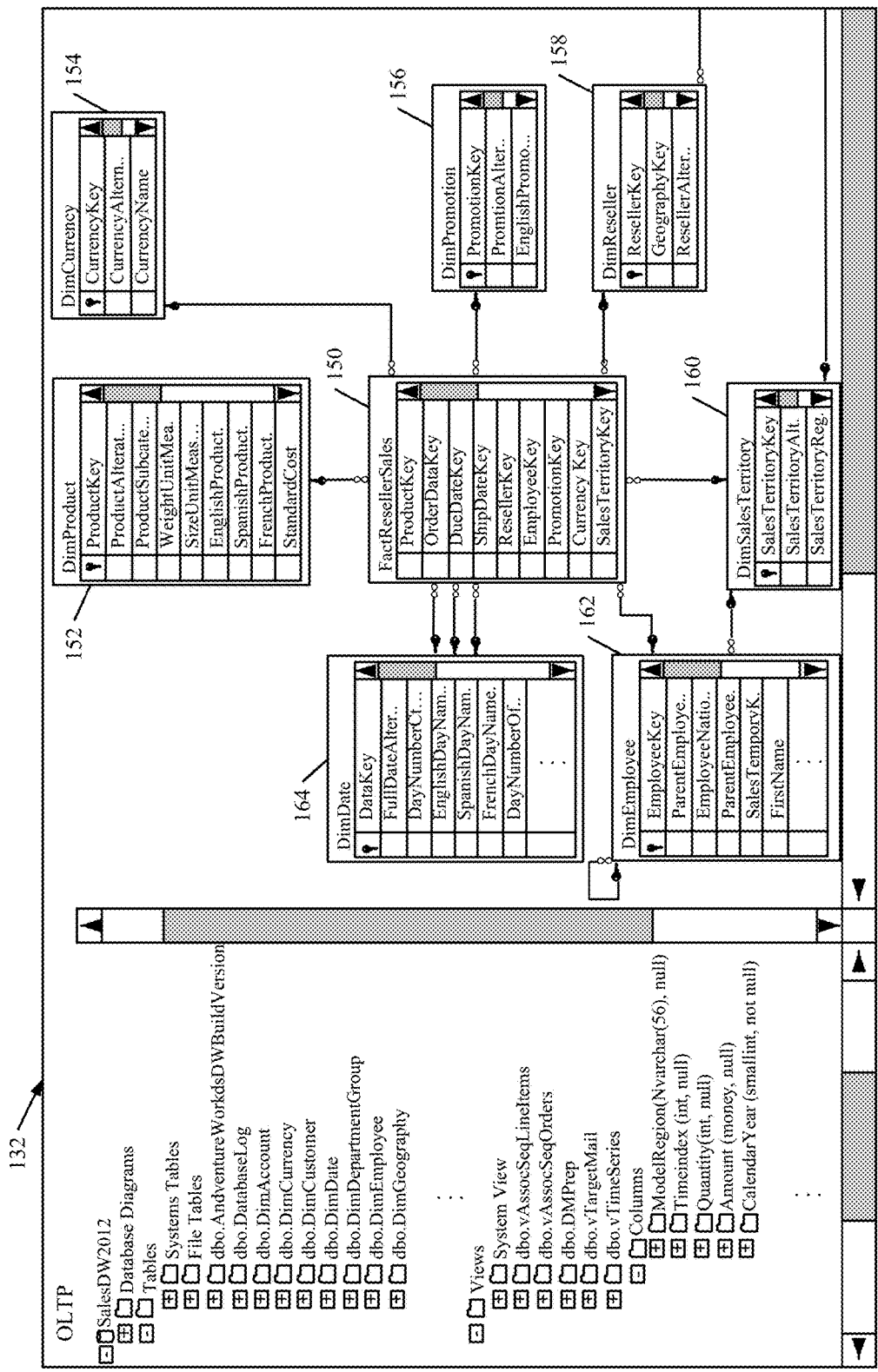
FIG. 3 is a diagrammatic view of an OLTP implementation of the star-schema shown in FIG. 2 in accordance with one embodiment. The specific embodiment uses in-memory technologies for fast querying, such as SQL Server column-store indexes.

FIG. 3 is a diagrammatic view of an OLTP implementation of star-schema 120 (shown in FIG. 2) in accordance with one embodiment. OLTP system 132 includes a FactResellerSales table 150 that is related to DimProduct table 152, DimCurrency table 154, as well as a relationship to DimPromotion table 156. Further, FactResellerSales table 150 is related to DimReseller table 158, DimSalesTerritory table 160, DimEmployee table 162, and DimDate table 164. System 132 implements, in OLTP, the functionality of star-schema 120, but is accessed using SQL statements. In-memory technologies, such as columnstore indexes, are not shown explicitly in FIG. 3 but embodiments described herein are applicable to, and specifically used in one implementation for, such deployments.

Figure 4:
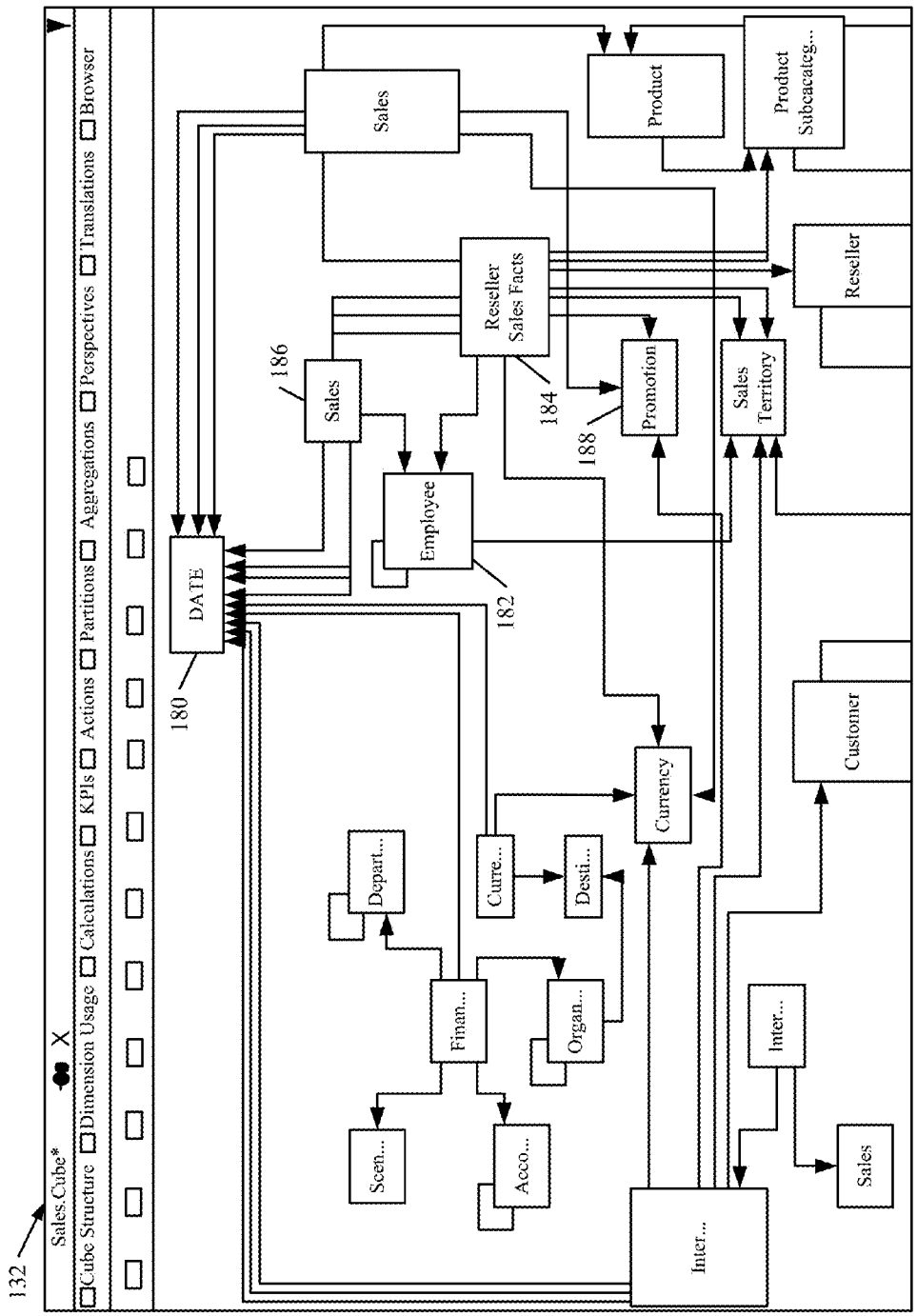
FIG. 4 is a diagrammatic view of an OLAP implementation of the star-schema shown in FIG. 2 in an accordance with one embodiment.

FIG. 4 is a diagrammatic view of an OLAP implementation of star-schema 120 (shown in FIG. 2) in an accordance with one embodiment. OLAP implementation 134 includes a number of measures and dimension objects, such as Date 180, Employee 182, Reseller Sales Facts 184, Sales 186, Promotion 188, et cetera. In an OLAP implementation, a cube is generally a logical organization of a multidimensional dataset. Typically, the edges of a cube contain certain dimension values and the body of the cube contains measure values. OLAP databases store and organize the data in a way that is optimized for performance of queries that read data. System 134 implements, in OLAP, the functionality of star schema 120, but is accessed using MDX.

Figure 5:
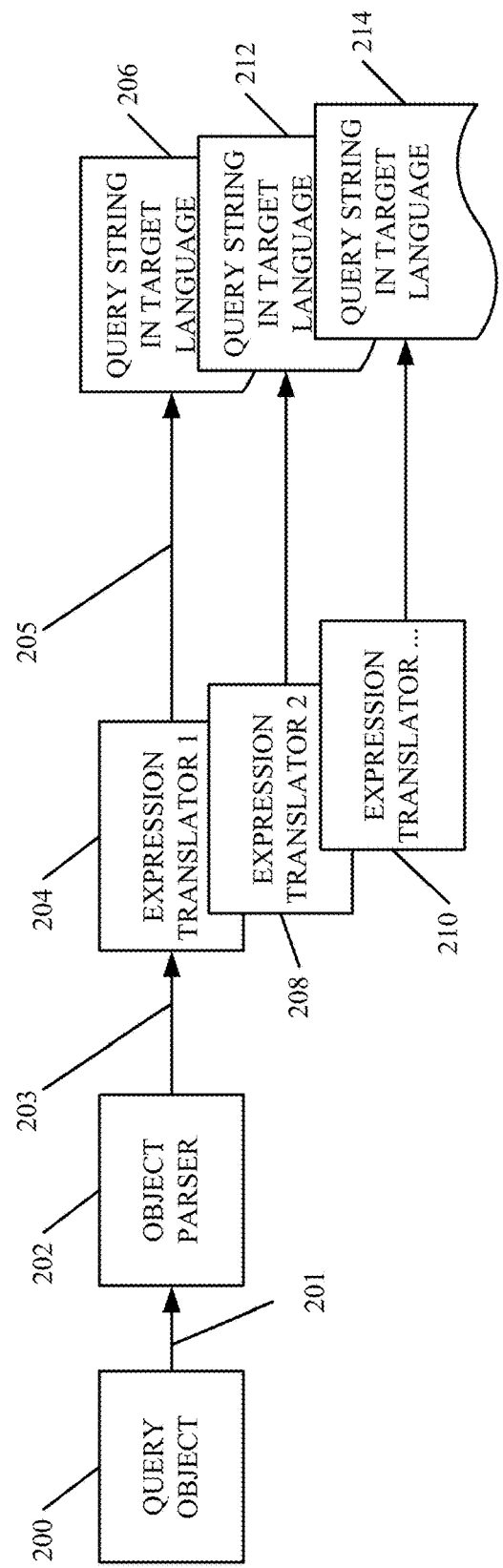
FIG. 5 is a diagrammatic view illustrating primary design components in the query translator approach in accordance with one embodiment.

FIG. 5 is a diagrammatic view illustrating primary design components in the query translator approach in accordance with one embodiment. Query object 200 is an object that is authored by a developer and is defined in accordance with a generic dimensional data model (described in greater detail below with respect to FIG. 6). Query object 200 is passed to object parser 202, as indicated at reference numeral 201. Object parser 202 receives query object 200 and generates a generic intermediate description of query object 200. This generic intermediate description of query object 200 is then passed to expression translator 204 (indicated at reference numeral 203), which translates the generic intermediate description of query object 200 into a query string in a target language, such as SQL 206, as indicated at reference numeral 205. As shown in FIG. 5, additional expression translators 208, 210, can similarly translate the generic intermediate description of query object 200 into different query string target languages MDX 212, HiveQL 214, respectively. Accordingly, a client application that includes query objects need not set forth specific query strings that target an underlying database technology, such as OLTP, but instead may employ a more generic dimensional data model for the source. Then, the data access can be switched to different types of data sources by simply using different expression translators 204, 208, 210. Further, as database technologies evolve and new technologies are developed, client applications that employ a query model that uses a generic dimensional data model for the data sources can take advantage of such new technologies by simply implementing new expression translators that are suitable for the new data sources.

Figure 6:
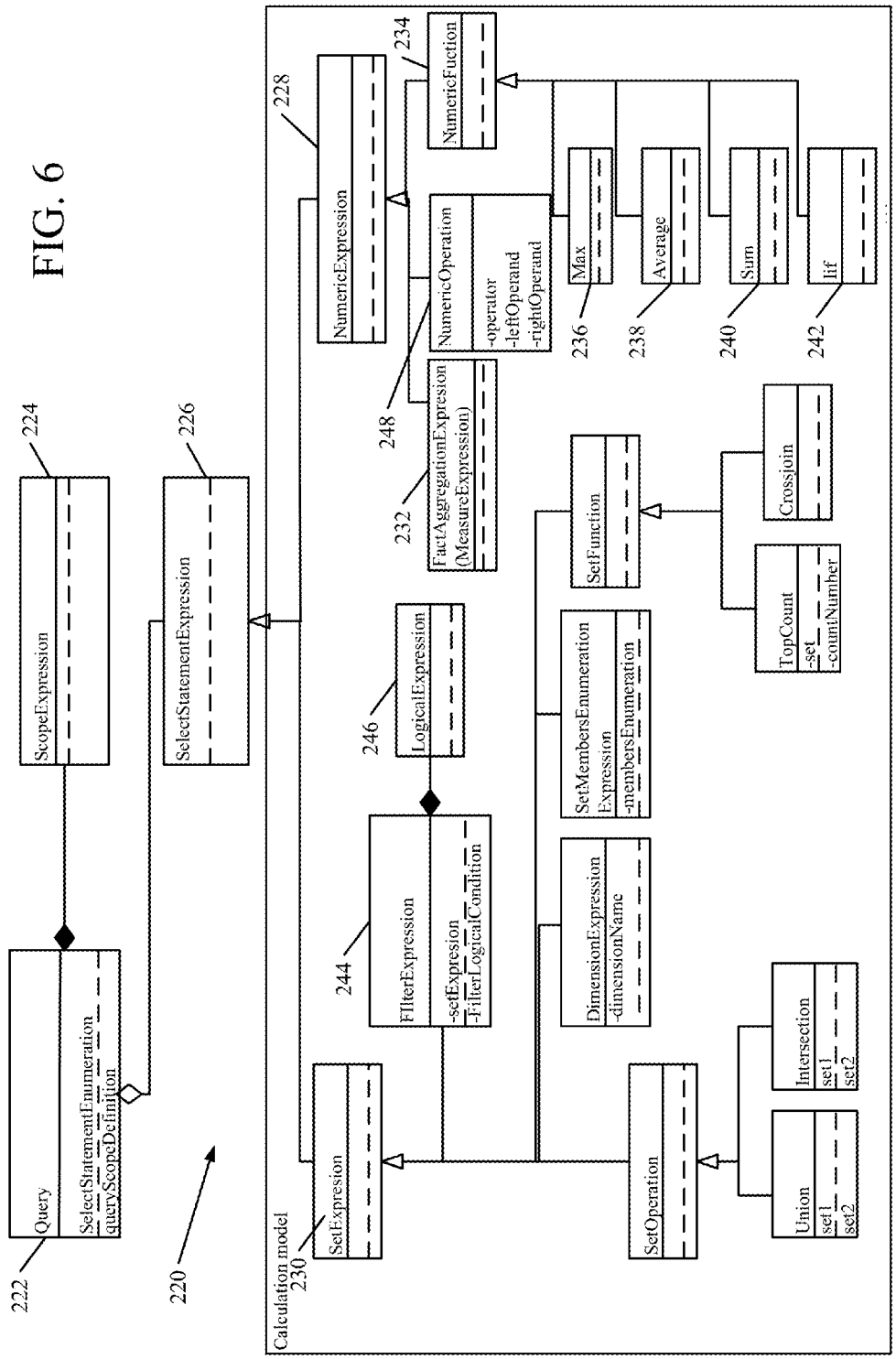
FIG. 6 is a diagrammatic view of a query model that assumes a generic dimensional data model for the data source in accordance with one embodiment.

FIG. 6 is a diagrammatic view of a query model that assumes a generic dimensional data model for the data source e.g., a data warehouse design, where each dimension consists of non-numeric attributes to describe the data and is linked to a numeric-fact dimensions using key relationships. These relationships are defined and stored in the data model used by the query object definition, and can be part of the query string generated by the translator or of the deployed data model, but they are transparent to the query object developer. A selection in a query is either an expression that evaluates to a numeric value, such as a calculation to sum the values in a fact set, or a set of non-numeric values, such as attribute properties. A selection expression can include results of operations on sets, which themselves evaluate to a set of values, or filter expressions, which consist of a logical condition applied to a set and that evaluate to a set of tuples. The query result is a set of n-tuples where "n" is the number of selections in the query. Functions that evaluate to either a numeric or a set expression can substitute their respective base type in the query selection and are, therefore, selectable objects in the query model.

FIG. 6 illustrates query model 220 for a multi-dimensional model. Accordingly, model 220 is suitable for data warehouse scenarios. Query 222 is connected to query scope expression 224, which defines the data model that is going to be queried by query 222 at runtime, after the query model is deployed to a target implementation. Select statement expression 226 is connected to query 222 and generally sets forth the various selects of the query. The selects that populate select statement expression 226 may be numeric expressions 228 and/or set expressions 230. Numeric expression 228 may be simple facts, such as an aggregation expression 232, operations between numeric expressions, including scalars 248, and/or numeric functions 234 such as maximum 236, average 238, sum 240, and IF 242. Set expression 230 can also include a filter expression 244 whose result-set is evaluated based on a logical condition 246. Additionally, set operations and functions can be provided as further shown in FIG. 6. The different types of objects that can be selected in a query make up the calculations model—a set of expressions, either numeric facts or properties describing facts, which can be combined by means of object composition to create more complex calculations and select expressions. Like the query itself, the calculation model is abstracted and, therefore, independent from the underlying data source. The abstractions in the calculation model allow the users to define reusable expressions that can be referenced from different queries or saved as part of, for example, data view definitions.

Figure 7:
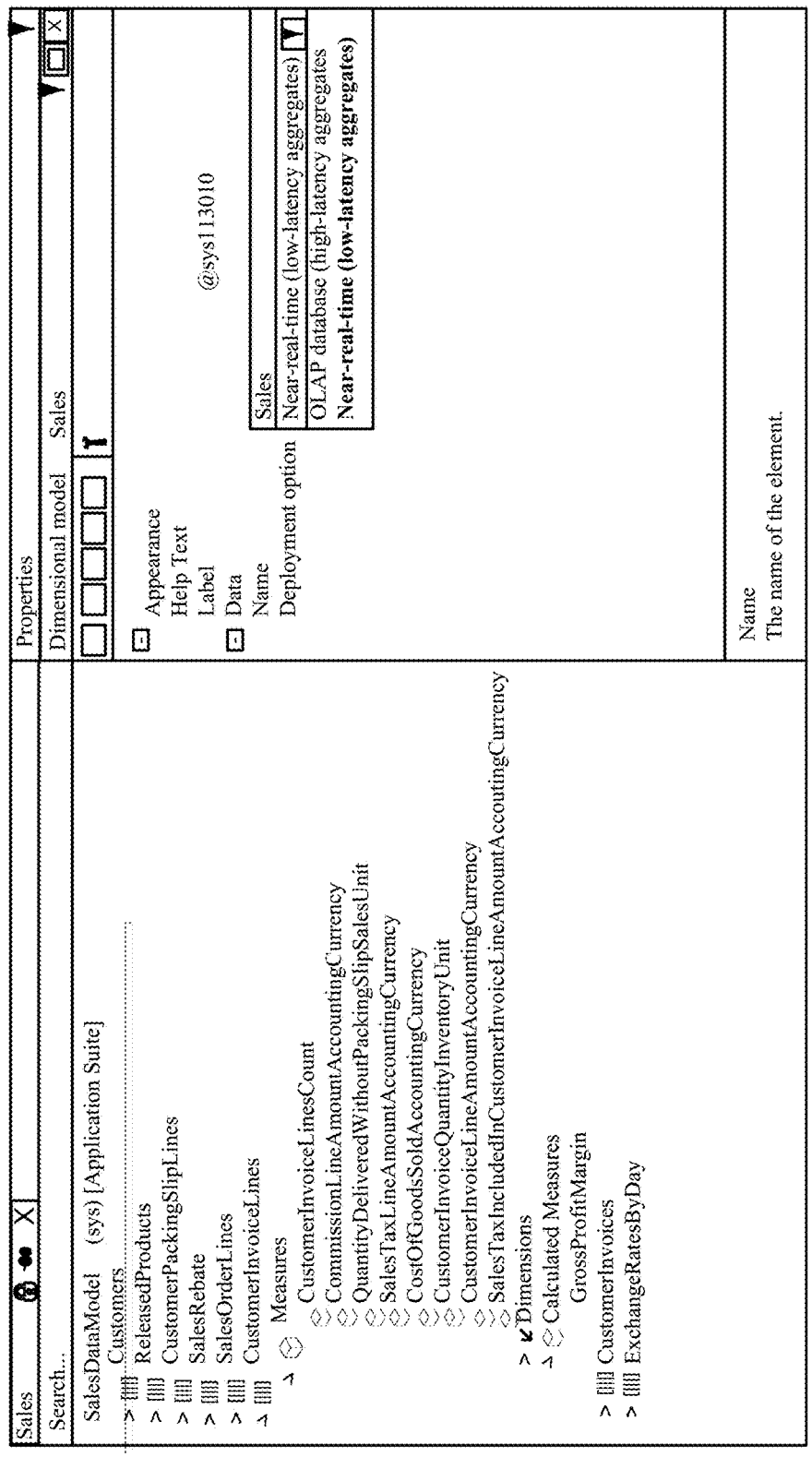
FIG. 7 is a diagrammatic view of a dimensional data model and selected object in accordance with one embodiment.

FIG. 7 is a diagrammatic view of a dimensional data model and selected object in accordance with one embodiment. FIG. 7 shows on the left side a dimensional data model, which is similar to the simplified star schema depicted in FIG. 1, and, on the right side, the properties of the selected Sales object. In this model, the data is organized in dimensions, which are collections of attributes that describe their related numeric facts. Examples of dimensions include: Customer, Product or Date, while facts can be aggregations of the sales amount or the invoice count. The fact objects are shown under the "Measures" node, and the calculation (numeric) expressions are grouped under the "Calculated Measures" node. Each of the objects is described by a set of properties, for example, the aggregate functions for the numeric facts and the relations between the dimensions and the facts, which are stored in the dimensional model. The definition of the reusable calculations can be implemented, for example, by means of methods defined in source code whose return type is a numeric expression, as defined in the calculation mode shown earlier, in FIG. 6.

The set of properties shown in FIG. 7 includes the options for the deployment target of the data model. In the example shown, two options are available: near-real-time (low latency aggregates) and OLAP. The near-real-time option corresponds to the deployment where the underlying data source is an operational, transactional database. Such operational, transactional database may be adapted or optimized for analytics scenarios with in-memory technologies, such as, columnstore indexes. The OLAP deployment option (not selected in FIG. 7) is a deployment to an online analytical processing database where fact-data aggregations are pre-calculated and data is de-normalized for the purpose of rapid read-queries. When this option is selected for deployment, for example, a number of software artifacts that support the OLAP model described in FIG. 4 are automatically generated, such as cube deployment scripts, which are then pushed to the OLAP server to deploy the corresponding OLAP database for the model. Similarly, other deployment options could be provided which include, without limitation, tabular models, cloud-based data storage systems and warehouse infrastructures with dedicated querying mechanisms, such as Hadoop and distributed file systems, HDInsight, Hive, et cetera.

Table 1 (below) is a code snippet of a query created programmatically in accordance with an object model such as that shown in FIG. 6. The query references the data model objects shown in FIG. 7.

TABLE 1

```
ScopeExpression Sales = new ScopeExpression(expressionstr("SalesDataModel"));
NumericExpression CustomerInvoiceAmount =
    new FactAggregationExpression(expressionstr("SalesDataModel/CustomerInvoiceAmount"));
NumericExpression COGS =
    new FactAggregationExpression(expressionstr("SalesDataModel/CostOfGoodsSold"));
NumericExpression Tax =
    new FactAggregationExpression(expressionstr("SalesDataModel/SalesTaxIncluded"));
NumericExpression GrossProfitMargin =
    CustomerInvoiceAmount − COGS − Tax; // calculation using a generic calculation model
SetExpression Date =
    new DimensionMembersExpression (expressionstr("Date/YearMonthDate/Date"));
SetExpression Company =
    new
DimensionMembersExpression(expressionstr("SalesDataModel/Company/CompanyID"));
MemberExpression jul2014 =
    new MemberExpression(Date, new KeyExpression("2014-07-29T00:00:00"));
MemberExpression usrt =
    new MemberExpression(Company, new KeyExpression("USRT"));
AggregateQuery aggregateQuery = new AggregateQuery( )
    .From(Sales)
    .AQSelect(
        CustomerInvoiceAmount,
        GrossProfitMargin.As("GPM"),
        new Range(
            jul2014,
            jul2014.Lag(300)
        ), // The Range is a filter over the set expression for Date
        new FilterExpression(
            SetExpression.ALL,
            new HasValue(usrt
            )
        )
    );
```

In accordance with the model described herein, a query consists of a set of select-expressions that can be one of two types: Numeric expression to select fact data, and Set expression to select the non-fact properties that describe the facts. Accordingly, all other expression types in the model derive from these two types, such as, for example, a Filter set expression, whose definition consists of a logical condition to be evaluated over the members of an input set expression. In the example shown in Table 1, the query lists the customer invoice amount for each date in the time interval between Jul. 29, 2014 and 300 days earlier. The selection also includes the Company dimension, but only values for USRT (US retail) company are shown as specified by the filter expression used in the query selection. Each selected field is assigned an alias by means of the "Alias" function, which allows the developer or programmer to reference the results in the dataset returned by the query execution.

The first few lines in the code snippet of Table 1 show a number of expressions declarations, such as the numeric CustomerInvoiceAmount, or non-numeric declarations such as—Company and Date. CustomerInvoiceAmount references a "fact" object whose definition as a sum over a numeric field in the fact dimension is part of the data model. This can be considered a declaration for an expression such as "SUM(field_name)" in a query language such as SQL. The expressions for Company and Date reference dimensions in the data model whose data members are selected in the query result. (expressionstr is an intrinsic function that takes as a parameter a reference to a data model object and performs a syntactical and semantical verification of that reference). This is useful, in some embodiments, in order to identify errors in the query definition prior to runtime.

The GrossProfitMargin declaration illustrates a basic calculation according to the generic calculation model described herewith. The calculation model allows operations, including simple arithmetic operations as well as complex functions, between instances of the numeric and set expressions types for building complex expressions by means of object composition. The definitions of the calculations are independent of the underlying implementation system for querying data sources and of the data bindings in the data model, which ensures reusability of the calculations and decoupling from the underlying data sources. The calculations use abstractions like FactAggregationExpression, which defines a simple aggregation, such as Sum or Count, or ScalarExpression, for single values. These abstractions are instantiated with references to the data model, such as the COGS expression shown in Table 1; The COGS expression instance references the CostOfGoodsSold object in the data model. The data model object can be bound to a data source, such as a table field, and to a specific aggregation functions, such as Count. This binding is independent of the calculation applied to it, which ensures that the calculation can be reused in different contexts in the application.

The member expressions reference specific data that is used in filtering the result set. For example, the usrt variable is a reference to the US Retail member in the Company dimension. The variable is used as an argument to a Has-Value function, which evaluates to a logical expression in the context of the filter for the Company dimension members.

As set forth above, in accordance with various embodiments described herein, the defined query object set forth in Table 1 is converted to a target data query language using a suitable translator. For example, Table 2 (below) shows an MDX translation of the query object.

Examples of the output of two different translators applied to the query object modeled in FIG. 6 and described programmatically in Table 1 are shown in Tables 2 and 3. The two output queries target different database systems. Table 2 shows a code snippet of an MDX query that is configured to target an OLAP database, while Table 3 shows a code snippet of an SQL query for a transactional data source. The output of the query object translations is in different query languages, MDX and SQL respectively. However, the two output queries are semantically equivalent and other target languages for translation can be considered as well, such as, HiveQL for accessing data in data warehouses deployed via cloud infrastructures deployed using distributed storage and processing technologies. That is, the client application can use the same query object to retrieve data from the data source systems, without changes to the code when the target deployment system for the data model changes between OLTP and OLAP databases.

```
WITH MEMBER [Measures].[GPM] AS
    [Measures].[CustomerInvoiceAmountAccountingCurrency]
    - [Measures].[CostOfGoodsSold]
    - [Measures].[SalesTax]
SELECT NON EMPTY
{
```
-continued
```
    [Measures].[CustomerInvoiceAmountAccountingCurrency] – fact
    [Measures].[GPM]
} ON COLUMNS,
NON EMPTY
(
    [Date].[Date__].&[2014-09-20T00:00:00] :
    [Date].[Date__].&[2014-09-20T00:00:00].Lag(300) – lag function
) ON ROWS
FROM (SELECT { [Company].[CompanyID].&[USRT]} ON COLUMNS
FROM [SalesOLAPDBCube])
    WHERE ({ [Company].[Company].[Company].&[USRT]})
```

TABLE 3

■ The translation of the calculation (GPM) is omitted here for simplification.
```
with dim
as (
    select [date] d1
    from bidatedimensionsview
    where [date] <= '20140920'
    and bidatedimensionsview.NAME = 'Date'
    AND bidatedimensionsview.dotnetculture = 'en-US'
)
,
lag
as (
    select *
    from (
        select d1
            , row_number( ) over (order by d1 desc) lag
        from dim
    ) lag_t
    where lag <= 300 + 1
)
,
fact as (
    select
        invoiceamountmst a1
        , invoicedate j1
    from custinvoicejour
        join partitions
            ON custinvoicejour.partition = partitions.recid
        join DATAAREA
            on custinvoicejour.DATAAREAID = DATAAREA.ID
    where partitions.partitionkey = 'initial'
    and DATAAREA.ID = 'USRT'
)
,
dimfact as (
select
    lag.d1
    , sum (a1) a1
from fact join lag
    on fact.j1 = lag.d1
group by lag.d1
)
select *
from dimfact
```

Accordingly, embodiments described herein facilitate easily changing the underlying implementation and technology of the data storage system without the client application being impacted. Accordingly, this considerably reduces migration costs of existing applications to new and/or alternative data storage technologies.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 8:
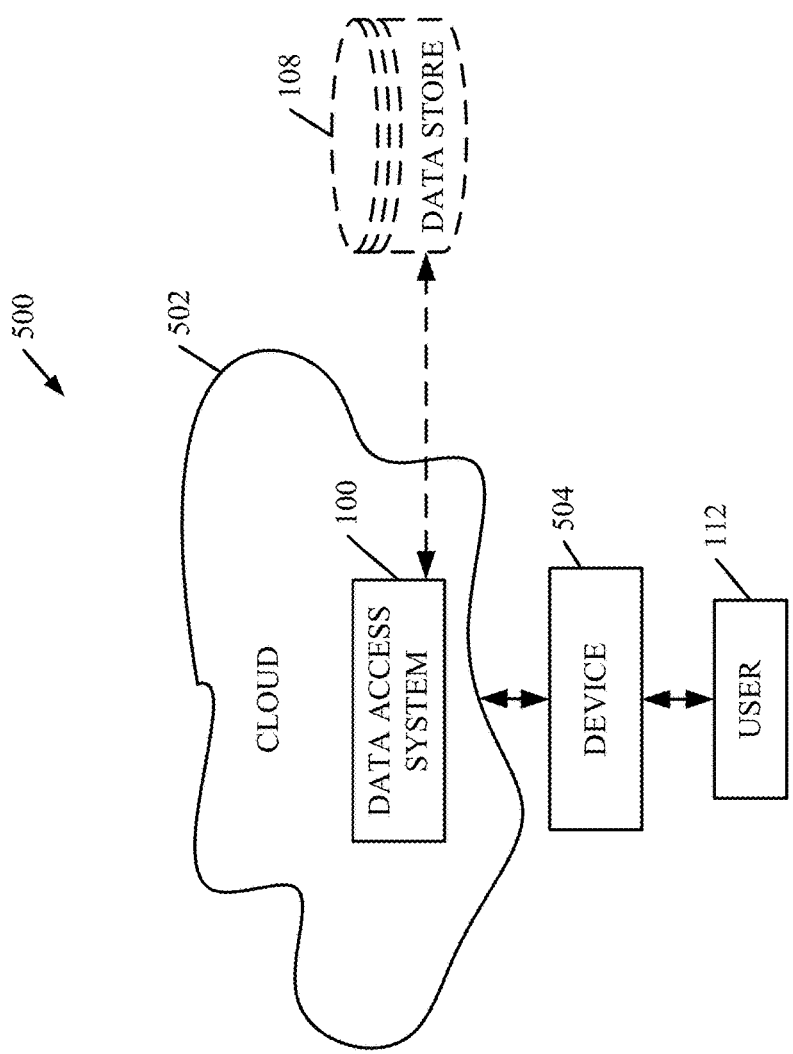
FIG. 8 is a block diagram of architecture 100, shown in FIG. 1, except that at least some of its elements are disposed in a cloud computing architecture 500.

FIG. 8 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

FIG. 8 illustrates that data access system 100 is located in cloud 502 (which can be public, private, or a combination where portions are public while others are private). Therefore, user 112 uses a user device 504 that includes a client application to access data within data store 108 through cloud 502.

FIG. 8 also depicts another embodiment of a cloud architecture. FIG. 8 shows that it is also contemplated that some elements of data access system 100 are disposed in cloud 502 while others are not. By way of example, data stores 108 can be disposed outside of cloud 502, and accessed through cloud 502.

It will also be noted that data access system 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
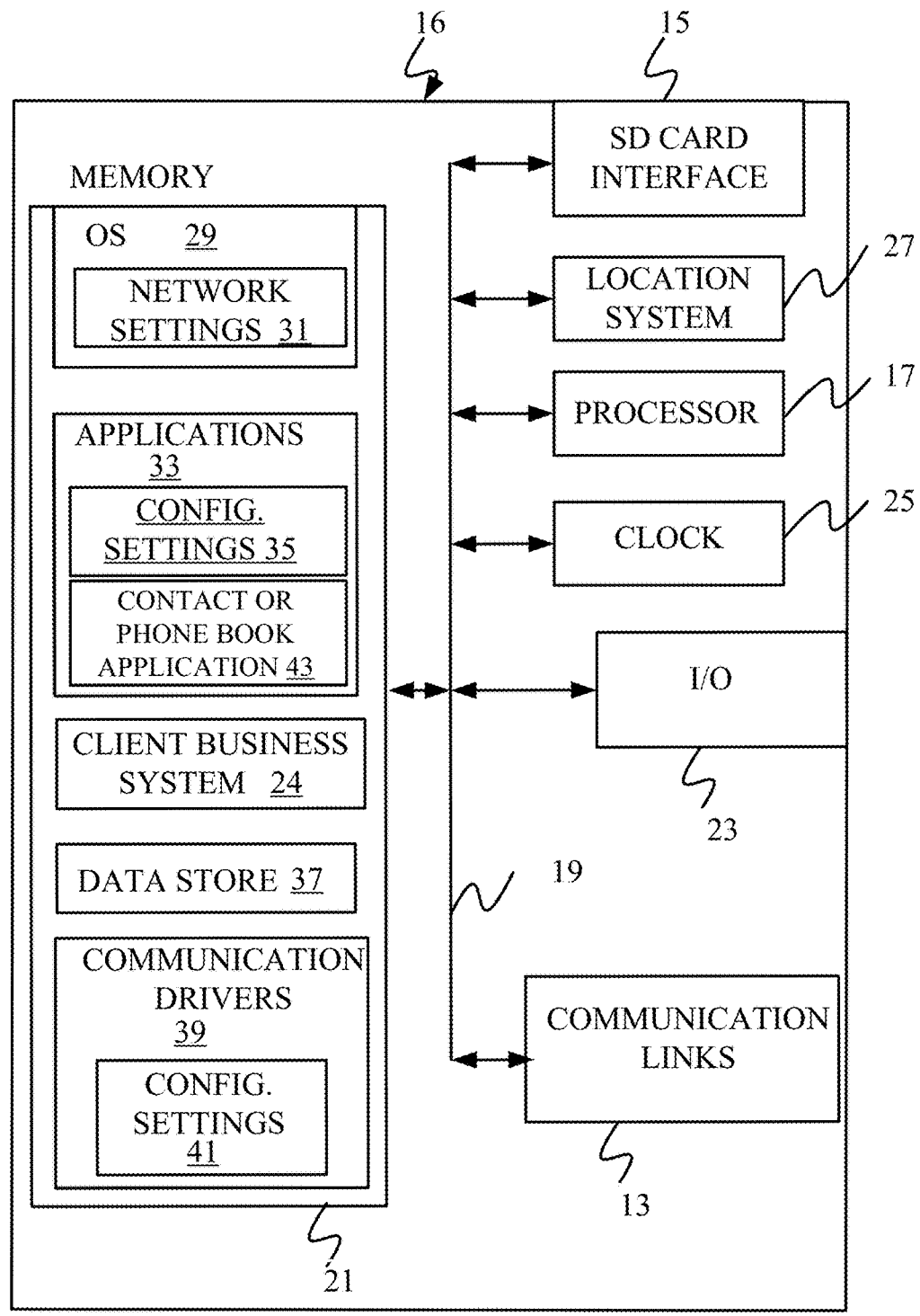
FIG. 9 provides a general block diagram of the components of a client device that can run components of data access system to interact with the data access system.

FIG. 9 provides a general block diagram of the components of a client device 16 that can run components of data access system 100 to interact with data access system 100. In device 16, a communications link 13 is provided that allows device 16 to communicate with other computing devices and under some embodiments provides a channel for receiving information automatically. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (such as client application 104) are received on a removable Secure Digital (SD) card that is connected to a SD card interface 15. SD card interface 15 and communication links 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Application 154 or the items in data store 156, for example, can reside in memory 21. In one embodiment, device 16 can embody all of data access system 100 (shown in FIG. 1) such that client application 104, data store 114 and execution platform 108 are all provided by device 16.

Examples of the network settings 31 include items such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 10:
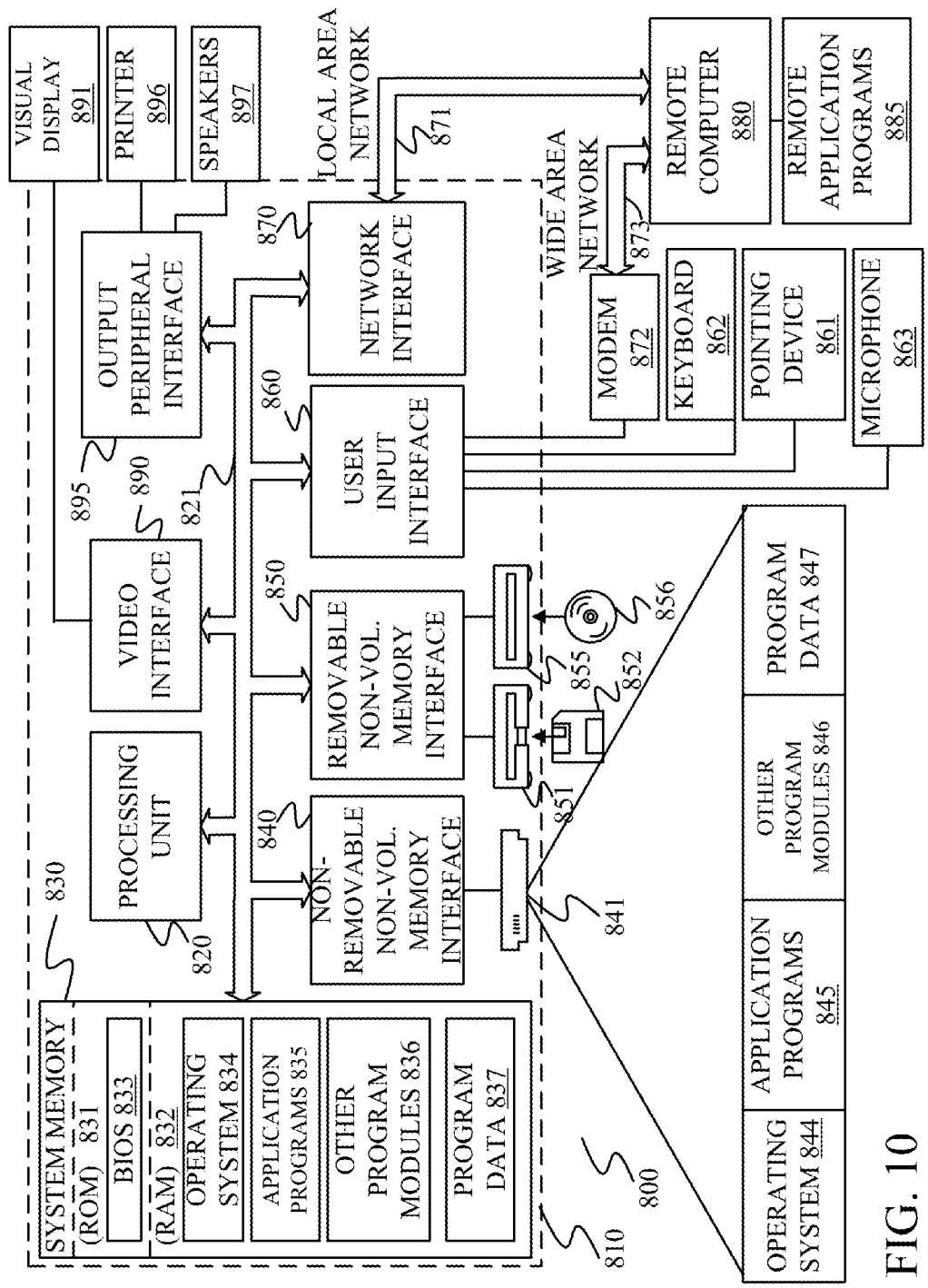
FIG. 10 is a general block diagram of a computing device that can run components of a data access system or client device that interacts with the data access system, or both.

FIG. 10 is a diagrammatic view of a computing environment in which data access system 100, or parts of it, (for example) can be deployed. With reference to FIG. 10, an exemplary system for implementing some embodiments includes a general-purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing device for executing a client application for analytics data access. The computing device includes a processor that is a functional component of the computing device and is configured to execute software instructions to provide at least one client application function. A parsing component is configured to receive at least one data object of the client application and parse the at least one data object to provide an intermediate description of a query. At least one translator component is configured to receive the intermediate description of the query and generate a query string in a target query language. The computing device is configured to transmit the query string in the target query language to a data source for execution of the query.

Example 2 is the computing device of any or all previous examples wherein the at least one translator component includes a plurality of translator component, each being configured to receive the intermediate description and generate a query string in a different target query language.

Example 3 is the computing device of any or all previous examples wherein one of the target query languages is SQL.

Example 4 is the computing device of any or all previous examples wherein one of the target query languages is MDX.

Example 5 is the computing device of any or all previous examples wherein the client application is a compiled client application written in an object oriented programming language.

Example 6 is the computing device of any or all previous examples wherein the data object conforms to a star-schema data model.

Example 7 is the computing device of any or all previous examples wherein the intermediate description is in the form of a syntax tree.

Example 8 is the computing device of any or all previous examples wherein the intermediate description applies at least one domain-specific rules.

Example 9 is the computing device of any or all previous examples wherein the intermediate description includes a security filter based on a user profile.

Example 10 is a computer-implemented method of processing a data object for analytics data access. The computer-implemented method includes providing a client application written in an object-oriented programming language. The client application has at least one data object defined for data access. The at least one data object is parsed to generate an intermediate query description. The intermediate query description is passed to a selected translator to generate a query output string in accordance with a target query language.

Example 11 is the computer-implemented method of any or all previous examples wherein the at least one data object is defined in accordance with a generic dimensional model.

Example 12 is the computer-implemented method of any or all previous examples wherein the at least one data object includes a query scope expression that defines a target of the query at runtime.

Example 13 is the computer-implemented method of any or all previous examples wherein the at least one data object includes a select expression that sets forth at least one selection of the query.

Example 14 is the computer-implemented method of any or all previous examples wherein the select expression is a set expression to select at least one non-fact property.

Example 15 is the computer-implemented method of any or all previous examples wherein the select expression is a numeric expression to select fact data.

Example 16 is the computer-implemented method of any or all previous examples wherein the numeric expression defines a calculation that is independent of a binding of the data object to a data source.

Example 17 is the computer-implemented method of any or all previous examples wherein the calculation is reusable in at least one different context in the client application.

Example 18 is the computer-implemented method of any or all previous examples wherein the target query language is SQL.

Example 19 is the computer-implemented method of any or all previous examples wherein the target query language is MDX.

Example 20 is a computer-based development environment for a client application that includes a processor that is a functional component of the computer and configured to execute software instructions to provide at least one development function. A user interface component is configured to generate a user interface that receives an object model definition and provides a plurality of selections for a deployment target for the object model definition, and automatically generates support for a deployment target upon receiving a user selection relative to a deployment target.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
   a processor; and
   memory, coupled to the processor, storing instructions that, when executed, cause the computing device to:
   receive, from a client application, a query object indicative of a query;
   in response to receiving the query object, identify a data source associated with the client application,
   the query object being defined according to an object model that is:
   expressed in an object-oriented programming language, and independent of a data model implemented by the data source;
   parse the query object to generate an intermediate description of the query;
   translate the intermediate description of the query into a query string in a target query language that corresponds to the data model implemented by the data source; and
   transmit the query string in the target query language to the data source for execution of the query.

2. The computing device of claim 1, wherein the target query language comprises a first target query language, and the instructions cause the computing device to receive the intermediate description and generate a query string in a second target query language that is different than the first target query language and corresponds, to a data model implemented by a second data source.

3. The computing device of claim 2, wherein one of the first or second target query languages is SQL.

4. The computing device of claim 2, wherein one of the first or second target query languages is MDX.

5. The computing device of claim 1, wherein the client application is a compiled client application written in the object oriented programming language.

6. The computing device of claim 5, wherein the query object conforms to a star-schema data model.

7. The computing device of claim 1, wherein the intermediate description is in the form of a syntax tree.

8. The computing device of claim 1, wherein the intermediate description applies a domain-specific rule.

9. The computing device of claim 8, wherein the intermediate description includes a security filter based on a user profile.

10. A computer-implemented method comprising:
    receiving, from a client application, a query object indicative of a query;
    in response to receiving the query object, identifying a data source associated with the client application,
    the query object being defined according to an object model that is:
    expressed in an object-oriented programming language, and independent of a data model implemented by the data source;
    parsing the query object to generate an intermediate query description;
    translating the intermediate query description into a query output string in accordance with a target query language that corresponds to the data model implemented by the data source; and
    transmitting the query string in the target query language to the data source for execution of the query.

11. The computer-implemented method of claim 10, wherein the query object is defined in accordance with a generic dimensional model.

12. The computer-implemented method of claim 11, wherein the query object includes a query scope expression that defines a target of the query at runtime.

13. The computer-implemented method of claim 11, wherein the query object includes a select expression that sets forth at least one selection of the query.

14. The computer implemented method of claim 13, wherein the select expression is a set expression to select at least one non-fact property.

15. The computer-implemented method of claim 13, wherein the select expression is a numeric expression to select fact data.

16. The computer-implemented method of claim 15, wherein the numeric expression defines a calculation that is independent of a binding of the query object to a data source.

17. The computer-implemented method of claim 16, wherein the calculation is reusable in at least one different context in the client application.

18. The computer-implemented method of claim 10, wherein the target query language is SQL.

19. The computer-implemented method of claim 10, wherein the target query language is MDX.

* * * * *